United States Patent [19]

O'Connell

[11] 4,392,687
[45] Jul. 12, 1983

[54] LIFTING AND TILTING TRAILER

[75] Inventor: Denis O'Connell, Mallow, Ireland

[73] Assignee: Institute for Industrial Research & Standards, Dublin, Ireland

[21] Appl. No.: 265,360

[22] Filed: May 20, 1981

[30] Foreign Application Priority Data

May 21, 1980 [IE] Ireland ................................. 1053/80
Apr. 8, 1981 [IE] Ireland ................................. 792/81

[51] Int. Cl.³ ............................................... B60P 1/34
[52] U.S. Cl. ...................................... 298/5; 254/3 R; 254/9 R; 280/30; 280/64; 298/11
[58] Field of Search .................. 298/5, 11, 20 R, 22 J; 414/471; 280/30, 43.15, 43.16, 43.17, 43.23, 64; 254/2 R, 2 B, 2 C, 8 R, 8 B, 8 C, 9 R, 9 B, 9 C

[56] References Cited

U.S. PATENT DOCUMENTS

| 682,932 | 9/1901 | Haltom | 254/8 C |
| 920,512 | 5/1909 | Wright | 298/11 |
| 1,606,796 | 11/1926 | Jones | 280/43.16 |
| 3,637,098 | 1/1972 | Wagenblast et al. | 298/11 X |
| 3,685,674 | 8/1972 | Bruer et al. | 298/11 X |
| 3,902,616 | 9/1975 | Santic | 298/11 X |

FOREIGN PATENT DOCUMENTS 2264765 5/1975 Fed. Rep. of Germany ...... 414/471

Primary Examiner—Leslie J. Paperner
Attorney, Agent, or Firm—Scully, Scott, Murphy & Presser

[57] ABSTRACT

A trailer comprises a container supported between a pair of scissors lifts having first and second arms movable about a pivot by a ram. The arms support the container by a pair of rollers and a mounting lug. The mounting lug comprises a lug on the container for engagement with a pair of U-shaped slots, a tilt slot and a lift slot. The lug engages the lift slot when the trailer is to be lifted. For tilting the lug engages the tilt slot thereby causing the rollers to disengage the container to permit tilting.

12 Claims, 20 Drawing Figures

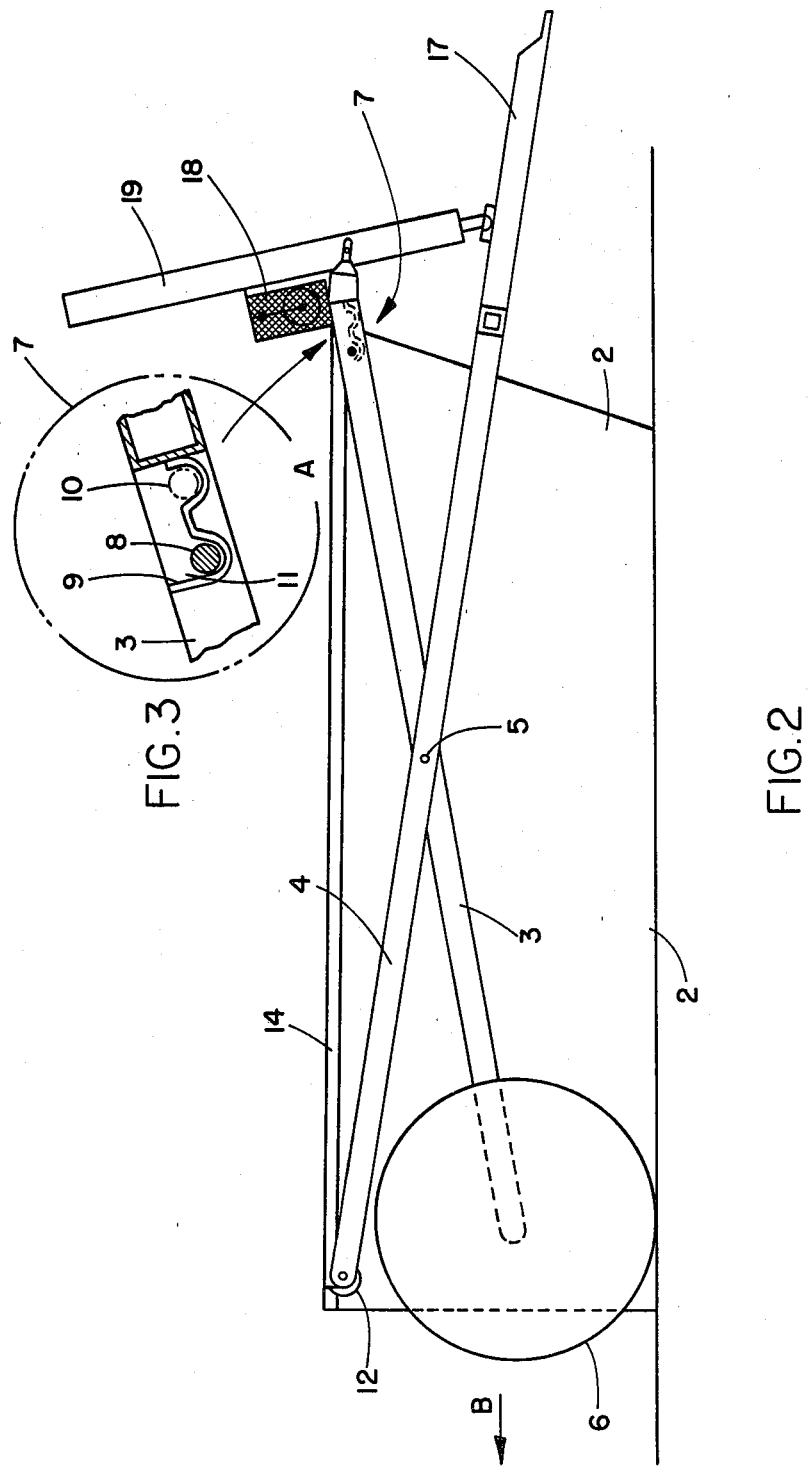

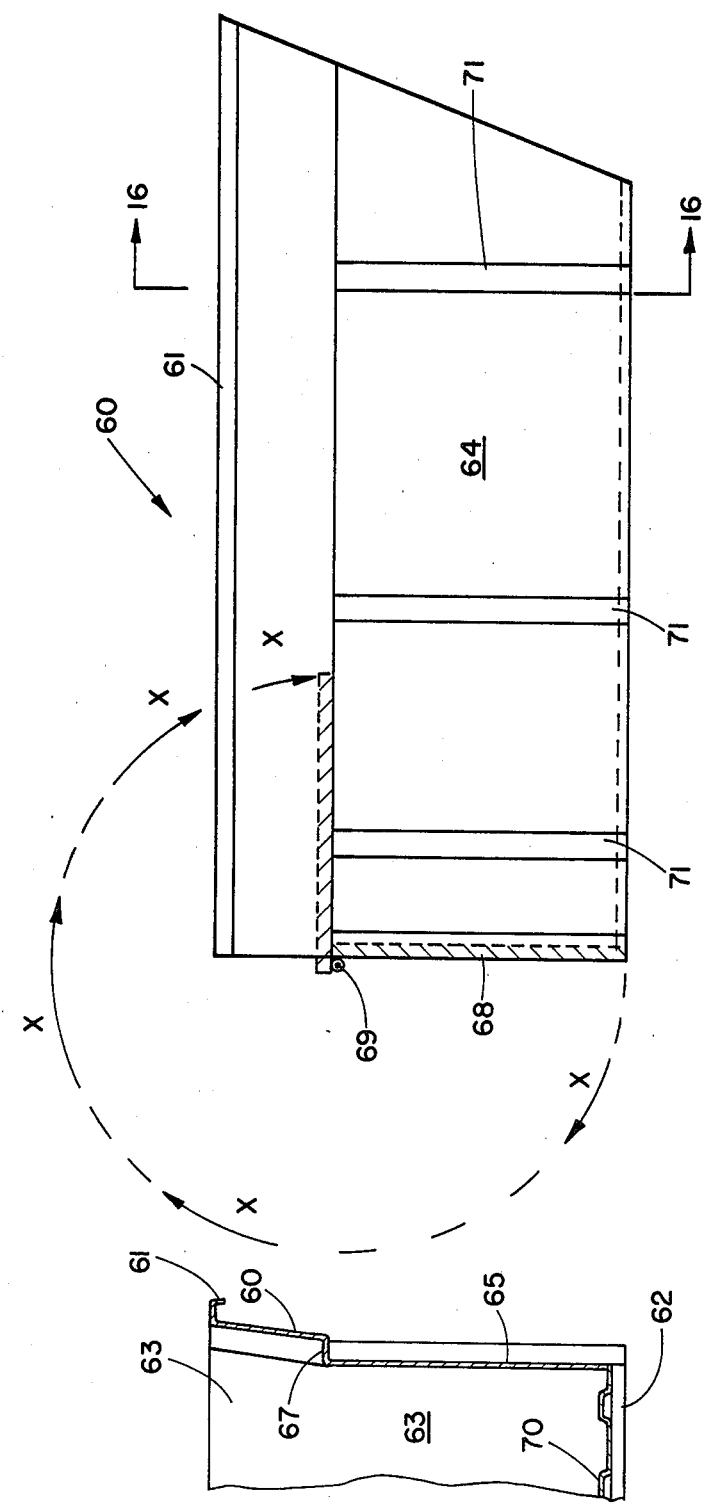

LIFTING AND TILTING TRAILER

BACKGROUND OF THE INVENTION

1. Field of the Invention

The present invention relates to a trailer, and in particular to a trailer of the type comprising a container supported for lifting and tilting between a pair of laterally spaced apart, co-operating scissors lifts.

2. Description of the Prior Art

The invention is particularly concerned with a trailer that can be used for many purposes. The term "trailer" as used in this specification not only relates to a trailer such as is towed by a tractor unit but also refers to truck bodies and the like. The terms "front" and "rear" are used in this specification insofar as they relate to the towing of the trailer, that is to say, the front and rear when the trailer is moving in the normal forwards direction.

There is a need for a multi-purpose trailer which can be, for example, used for loading at ground level, transporting and delivering at a higher level or possibly for loading at a high level and unloading at a lower level. Such a trailer should also be capable of tipping.

Generally speaking, such a trailer, has applications in industry and in agricultural.

One such trailer which meets some of these requirements is disclosed in French Patent Specification No. 2368382. Essentially, the trailer comprises a container or platform mounted for tilting and lifting on a base member by means of a scissors lift. The scissors lift is connected between the container and the base. By moving the arms of the scissors lift relative to each other the container may be raised and lowered above the base. The container is tilted by disconnecting the free end of one of the arms from either the base or the container and rising that end of the container relative to the other end.

Unfortunately, this trailer suffers from a number of disadvantages. Firstly, because the container is mounted on a base, it is not possible to lower the container to rest on the ground. Secondly, because of the construction of the trailer, a second operation is required in order to disconnect the arms of the scissors lift for tipping. This, needless to say, is time consuming and cumbersome.

OBJECTS OF THE INVENTION

The object of the present invention is to provide a trailer of the type hereinbefore described in which the container may be efficiently lifted and tilted.

A further object of the invention is to provide a trailer in which the container may be lowered to rest on the ground.

A still further object of the invention is to provide a trailer in which the container may be disengaged from the rest of the trailer.

SUMMARY OF THE INVENTION

According to the invention there is provided a trailer comprising:

a container;

a pair of co-operating scissors lifts laterally spaced apart for reception of the container therebetween, each scissors lift comprising a first and second support arm pivotally connected intermediate their ends to define a scissors pivot;

means for moving the support arms relative to each other to operate the scissors lift;

a pair of wheel axles, the wheel axles being respectively connected to the first support arms at their rear ends;

a mounting means for pivotal connection of the front end of the first arms to the container, the mounting means defining longitudinally spaced apart tilt and lift pivot positions for the container relative to the scissors pivot; and engagement means adjacent the rear end of the second arms to slidably engage the container, the engagement means being disengageable from the container when the first arms are in the tilt position.

In one embodiment of the invention the mounting means comprises a lug on the container projecting laterally therefrom for engagement in a pair of side by side U-shaped longitudinally spaced-apart slots in the first arm, the slot furthest from the scissors pivot defining the tilt pivot position and the other slot the lift pivot position the slots being so arranged that in the lowermost position of the first arm the lug lies above the slots and the first arm may be moved with the trailer, relative to the container on the ground, to change the pivot position.

In an alternative embodiment of the invention the mounting means comprises a lug for mounting on the first arm to project laterally therefrom to engage in a pair of side by side longitudinally spaced-apart inverted U-shaped slots in the container the slot nearest the front of the container defining the lift pivot position and the other slot the tilt pivot position, the slots being so arranged that in the lowermost position of the first arm the lug lies below the slots and the first arm may be moved with the trailer relative to the container on the ground to change the pivot position.

In a further embodiment of the invention at least the slot defining the lift pivot position is elongated transversely relative to a restricted entry mouth.

Preferably, the lug is so dimensioned that it is narrower in cross-section about one axis to allow entry to the mouth in the lower position of the front arm and on raising the trailer and pivoting the lug in the slot prevents exit from the slot.

Advantageously, each slot includes an outwardly diverging portion from its mouth for location of the lug.

In another embodiment of the invention the second support arms are bridged adjacent their rear ends by a container support bracket formed from a transverse support member and a pair of spaced apart uprights each of which is connected at its upper end to a second support arm.

In a further embodiment of the invention each second arm at its rear end engages the container by means of an inwardly directed roller mounted on a transverse stub axle, said roller lying beneath and within a channel section formed by a flange mounted on a longitudinal side of the container.

In a still further embodiment of the invention a locking member is provided between a first and second support arm the locking member comprising a bar pivotally mounted between the uppermost of the two arms some distance from the scissors pivot and a socket member for the other arm for reception of the free end of the bar.

The main advantage of the present invention is that the container can be lifted and tilted by the scissors mechanism. This, it will be appreciated is achieved by means of the mounting means which pivotally connects the container to the first arm of the scissors lift.

Another advantage of the invention is that the container can be lowered to rest on the ground. This is achieved by virtue of the construction of the scissors lift.

A still further advantage of the invention is that the container can readily easily be disengaged from the rest of the trailer. This is achieved by virtue of the mounting means.

These and other objects and advantages of the invention will be readily apparent from the following description of some preferred embodiments thereof which are given by way of example only and do not limit the scope of the invention.

BRIEF DESCRIPTION OF THE DRAWINGS

FIG. 2 is a side view of the trailer almost fully lowered with its container on the ground, FIG. 3 is a detailed sectional view of portion of the trailer illustrated in FIG. 2 and identified thereon by the arrow A.

FIG. 15 is a side view of a container according to the invention, FIG. 16 is an end sectional view in the direction of the arrows XVI—XVI of FIG. 15.

DETAILED DESCRIPTION OF THE INVENTION

Figure 1:
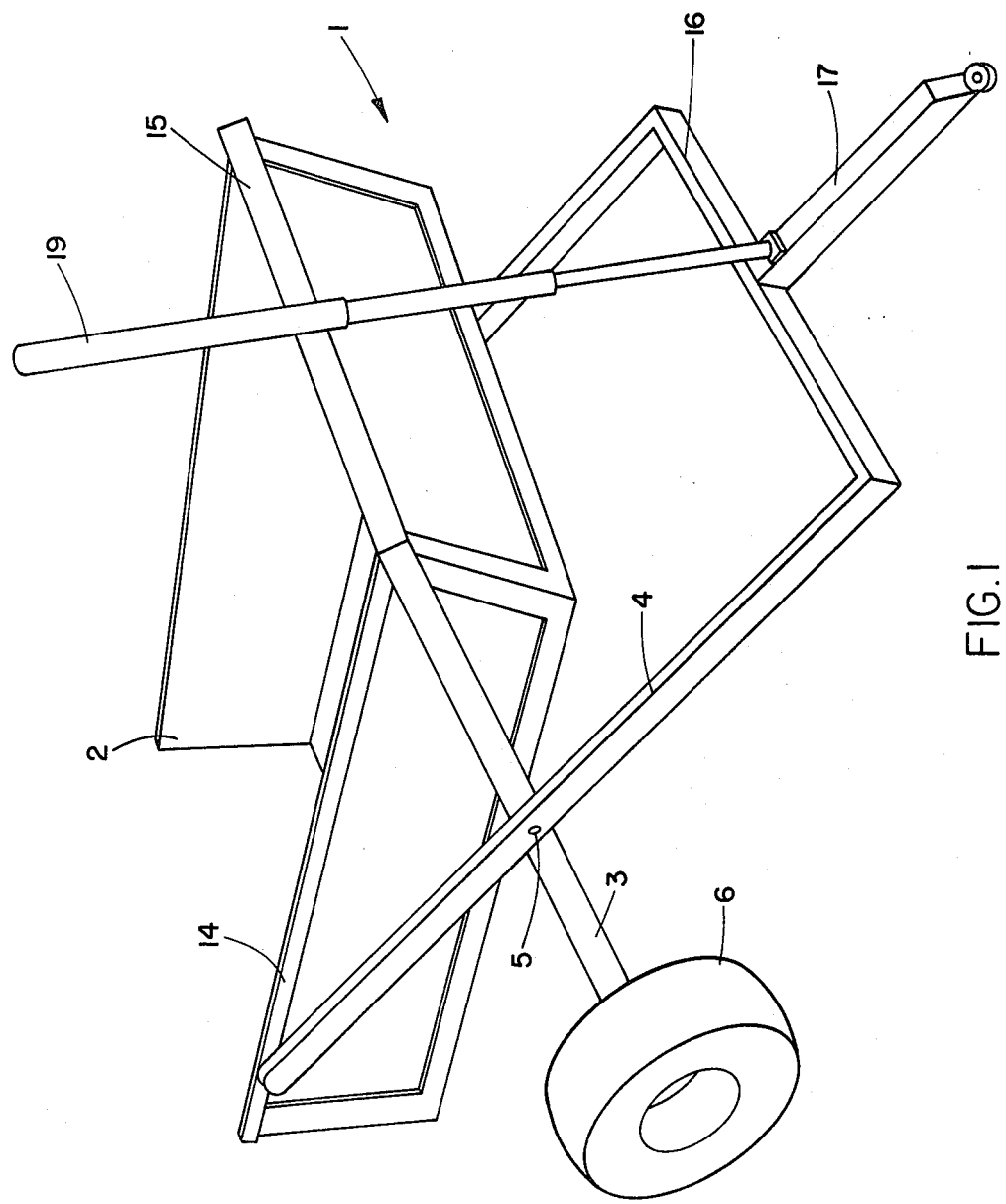
FIG. 1 is a perspective view of a trailer according to the invention.

Referring to the drawings and initially to FIGS. 1 to 7 thereof there is provided a trailer indicated generally by the reference numeral 1 for the reception of a container 2. The trailer 1 essentially comprises a pair of interconnected scissors lifts each scissors lift being formed by a first support arm 3 and a second support arm 4, interconnected intermediate their ends about a scissors pivot 5. The first arm 3 is connected at its rear end to a wheel stub axle (not shown) on which is mounted a ground engaging wheel 6. At the front end of the first arm 3 there is mounting means indicated generally by the reference numeral 7 for pivotally connecting the first arm 3 to the container 2. This mounting means 7 is sown in detail in FIG. 3. The mounting means 7 comprises a lug 8 mounted on the container 2 for engagement with a pair of U-shaped longitudinally spaced apart slots in the first arm 3. The said U-shaped slots are formed by a projecting plate 9, bent into the appropriate shape. The U-shaped slots form tilt and lift pivot positions 10 and 11 respectively.

Essentially, the tilt pivot position ensures that the container is in a more forward position relative to the lift pivot than in the lift pivot position. Thus, in the above embodiment the tilt pivot position corresponds to the forward U-shaped slot on the first arm 3 i.e. farthest towards its end and hence away from the scissors pivot. If, however, the lug were to be on the first arm and the slots on the container the rearward U-shaped slot on the container (or innermost relative to the container) would define the tilt pivot position as it would bring the front of the container further away from the scissors pivot.

Engagement means adjacent the rear ends of the second arms 4 slidably engage the container 2. The engagement means comprise; inwardly directed rollers 12 mounted on stub axles 13, which engage a channel-shaped section formed by a flange 14 on the container 2; this again is shown in detail in FIG. 7.

The first arms 3 are bridged adjacent their front ends by an upper-cross member 15 as are the second arms 4 by a lower cross-member 16 which in turn is connected to a tow-bar 17. A conventional winch 18, for clarity, only shown in outline in FIGS. 2 to 5, inclusive is mounted on the container 2. A means to move the arms 3 and 4 relative to each other to operate the scissors is provided by a tilting ram 19 mounted between the tow bar 17 and the upper cross-member 15.

Referring initially to FIG. 2 of the drawings, the trailer 1 is shown with the container 2 lying on the ground with the tipping ram 19 slightly extended and the lug 8 engaged in the lift pivot position. It will be appreciated that the tipping ram 19 may be retracted to lower the first support arm 3 still further and hence disengage the lug 8 from the lift pivot position 11. When this is the case the trailer 1 may be disengaged entirely from the container 2.

Figure 4:
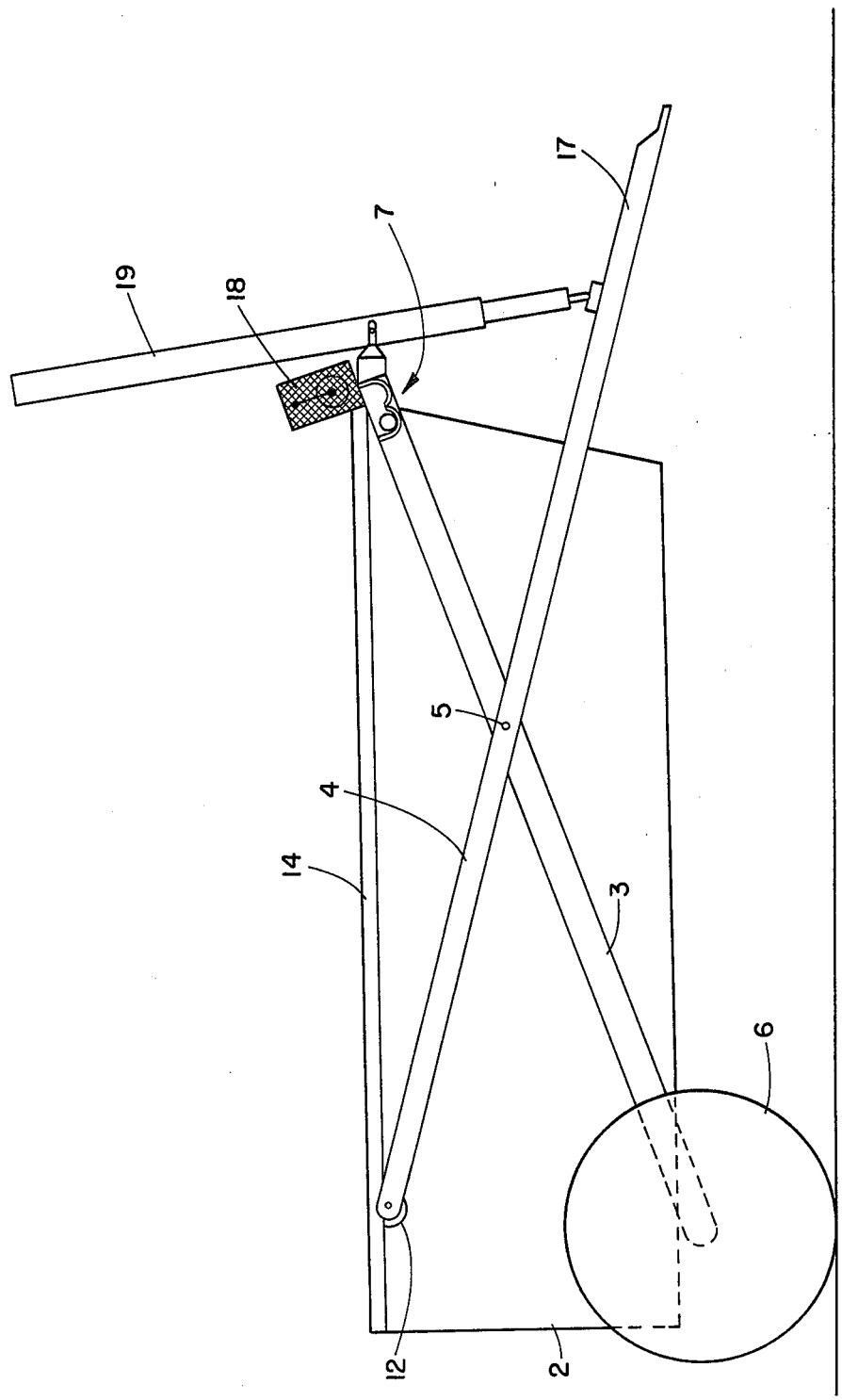
FIG. 4 is a side view of the trailer in the transporting position.
Figure 5:
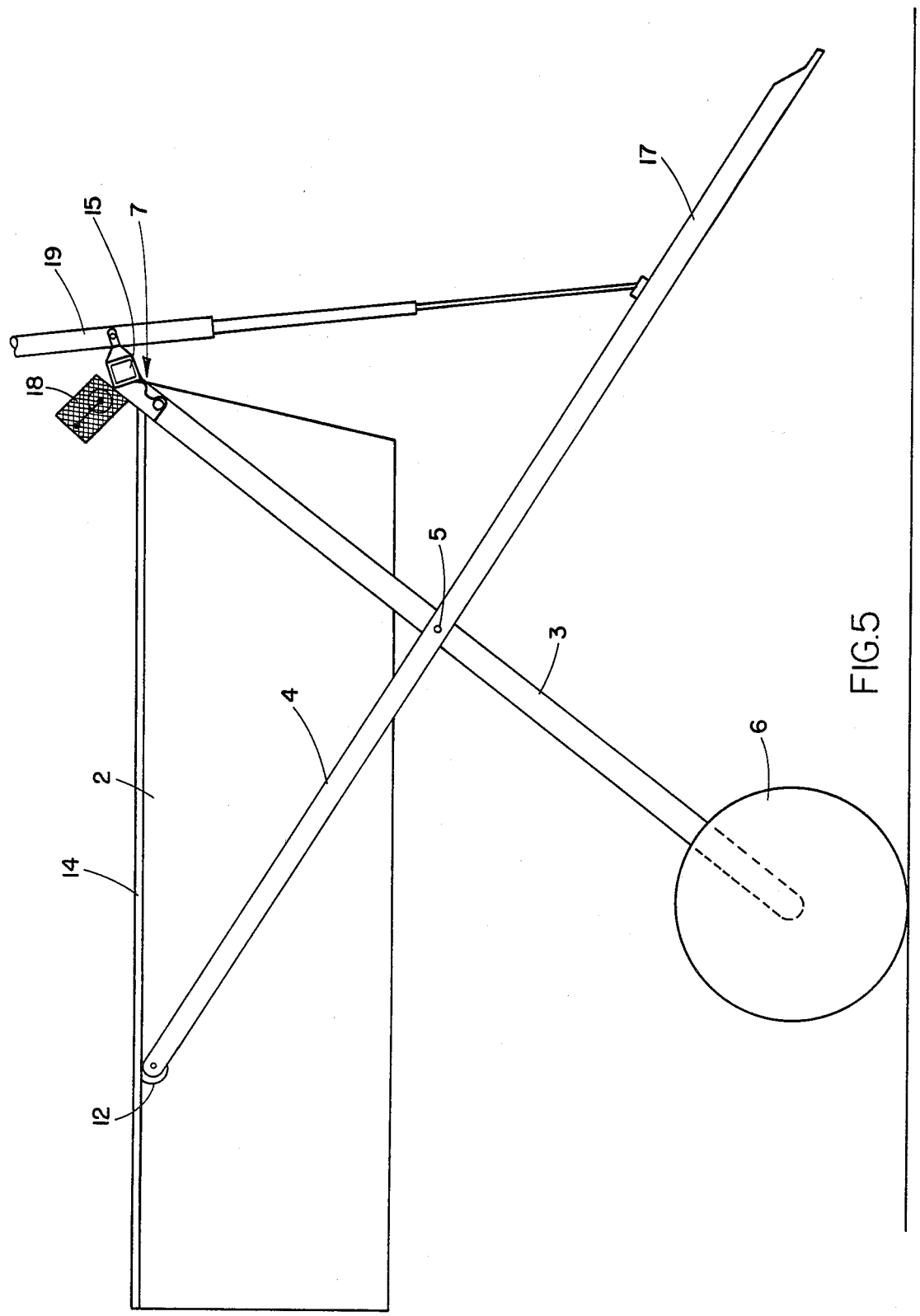
FIG. 5 is a side view of the trailer in the raised position.
Figure 6:
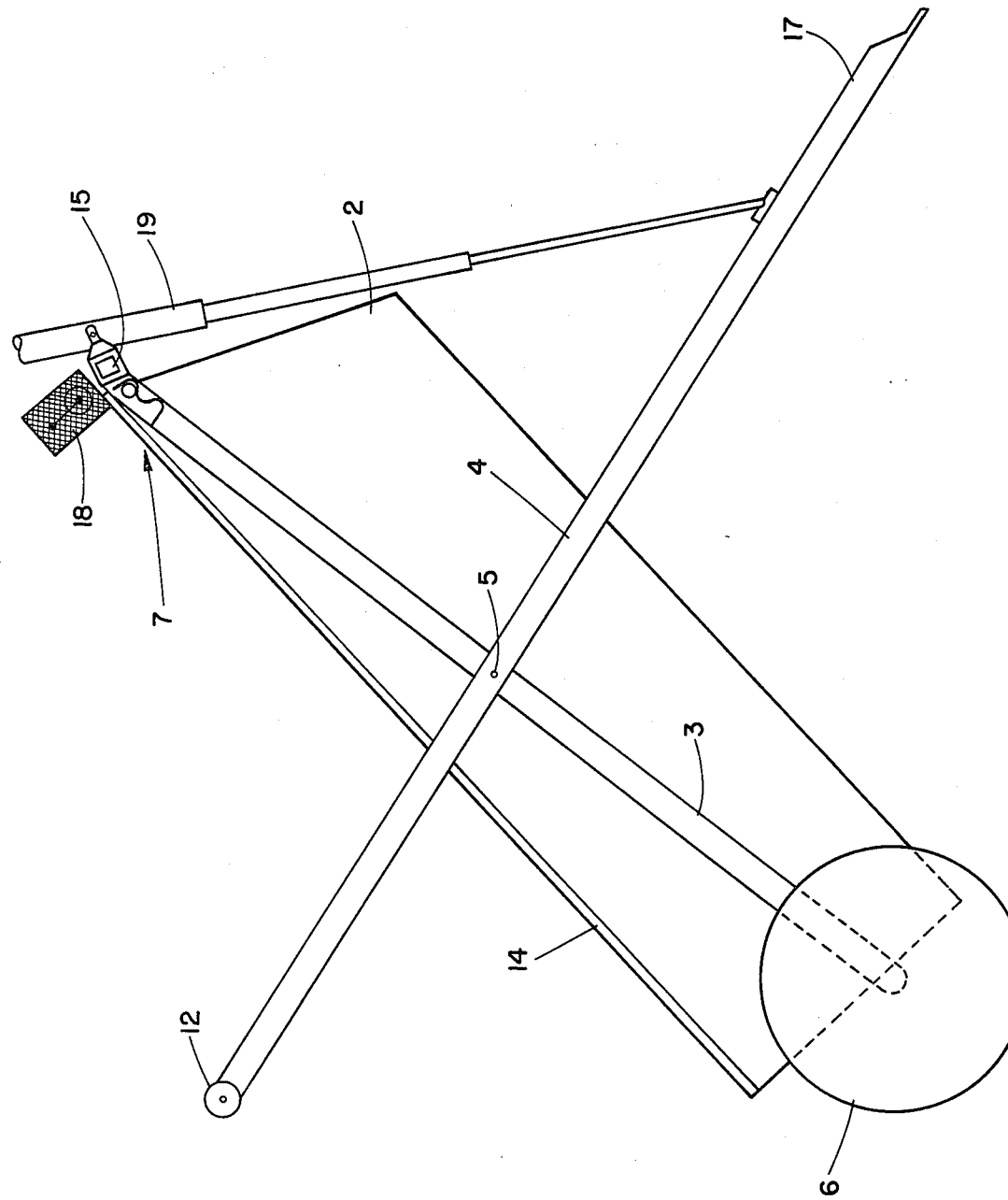
FIG. 6 is a side view of the trailer in the tipping position.
Figure 7:
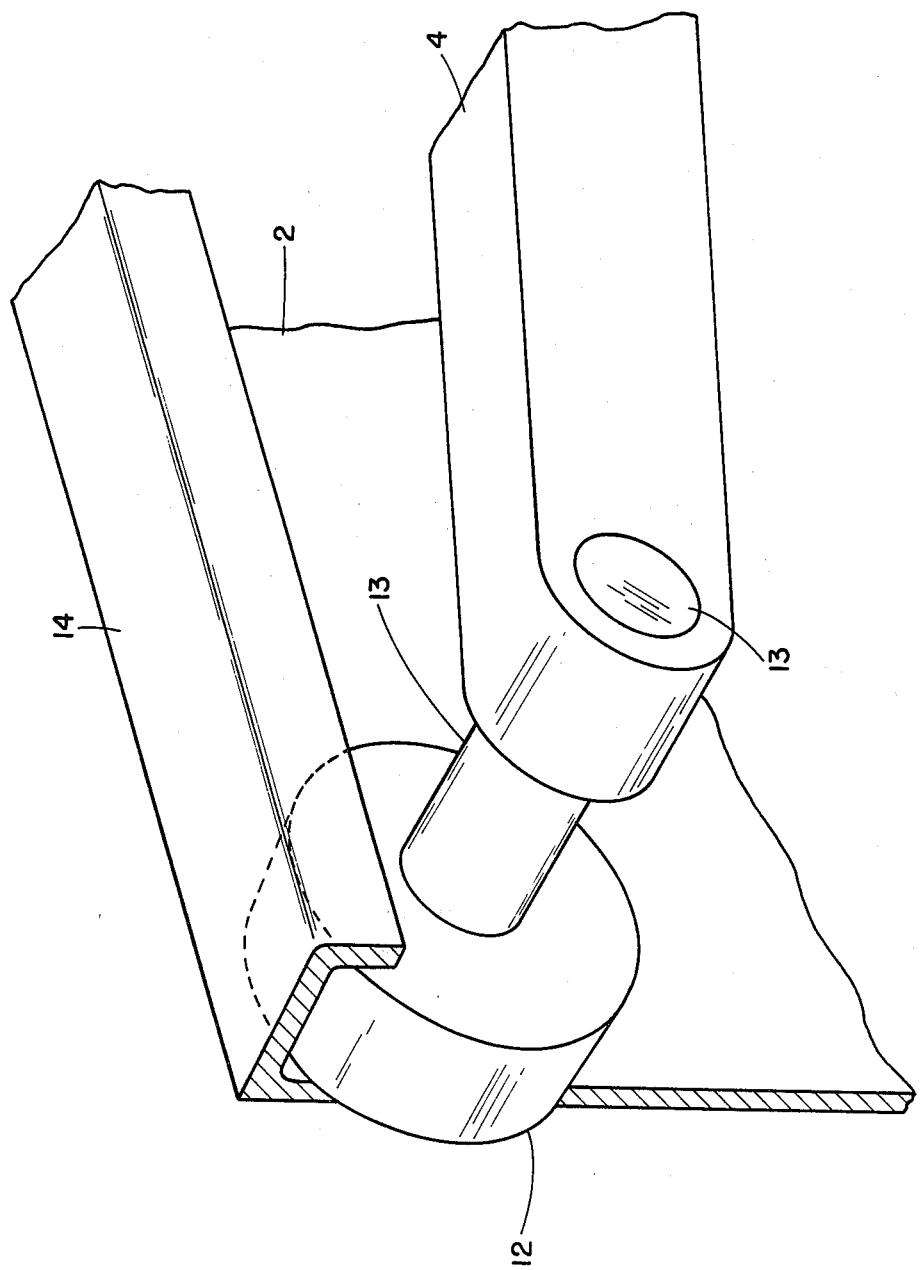
FIG. 7 is a perspective detail of portion of the trailer.

As the tipping ram 19 is extended the container 2 will be raised as illustrated in FIG. 4. This position is ideal for a transporting position and the trailer operates as a normal trailer. It it is desired to raise the container 2 higher for loading or unloading in an elevated position this may be done as illustrated in FIG. 5. When it is desired to tip the container, the container is lowered until it rests on the ground as illustrated in FIG. 2. The lug 8 is disengaged from a lift pivot position 11 by dropping the first support arm 3. The trailer is then moved rearwards in the direction of the arrow B so that the spud 8 is above the U-shaped slot forming the tilt pivot position 10. The ram then is used to raise the first support arm 3. With the lug 8 in the tilt pivot position 10 the container 2 is pivoted as illustrated in FIG. 6.

Referring to FIGS. 8 to 12 inclusive, there is illustrated an alternative construction of trailer; parts common to those of the trailer described with reference to FIGS. 1 to 7 are identified by the same reference numerals. In this embodiment of the invention there is provided a mounting means, indicated generally by the reference numeral 20. The mounting means 20 comprises a lug 21, only shown in detail in FIG. 12, mounted on the first arm 3, for engagement in a pair of slots 22 and 23 defining lift and tilt pivot positions respectively in the flange 14.

Referring to FIG. 12 there is illustrated portion of the first arm 3, shown by interrupted lines, and of the flange 14. The slot 22 defining the lift pivot position is elongated relative to a restricted entry mouth 24. The lug 21 is formed from a pair of bars welded together and is so dimensioned that it is narrower in cross-section about one axis and as will be seen from the description later, this is so arranged as to allow entry through the mouth 24 in the lower position of the front arm 3 and on raising the trailer and pivoting the lug 21 in the slot prevents exit from the slot. While in this embodiment the slot 23 does not have a restricted entry mouth 25 it could equally well have one. It will however, be noted that each slot 22 and 23 includes outwardly diverging portions 26 and 27 which are essentially extensions of the slot. These outwardly diverging portions 26 and 27 assist in the location of the lug 21 in the appropriate slot.

A locking member, indicated generally by the reference numeral 28 is provided and comprises a bar 29 pivotally suspended at 30 from the upper cross-member 15 and adapted to engage a socket 31 in the lower cross-member 16. Essentially, the locking member is provided between a first and second support arm so as to provide a rigid support for the container during transport and also for safety reasons in the event of the tipping ram 19 failing.

This embodiment of the invention operates in substantially the same manner as the previous embodiment except that it will be noted from examination of the drawings and in particular FIG. 12 that because of the orientation of the lug 21 on the first arm 3 that it assumes different positions in the slots depending on whether the arm is raised or not. For example, in the position illustrated in FIG. 12a in the lowered position the lug 21 is so oriented as to be able to pass through the entry mouth 24. It will be appreciated that in the fully raised position as illustrated in FIG. 12b it would be impossible for an unbalanced load on the container to cause the container to move and thus pull the lug 21 out of the slot 22. FIGS. 12c and 12d illustrate the position of the lug 21 in the slot 23, firstly when the container is on the ground and secondly when the container is being tipped.

Figure 8:
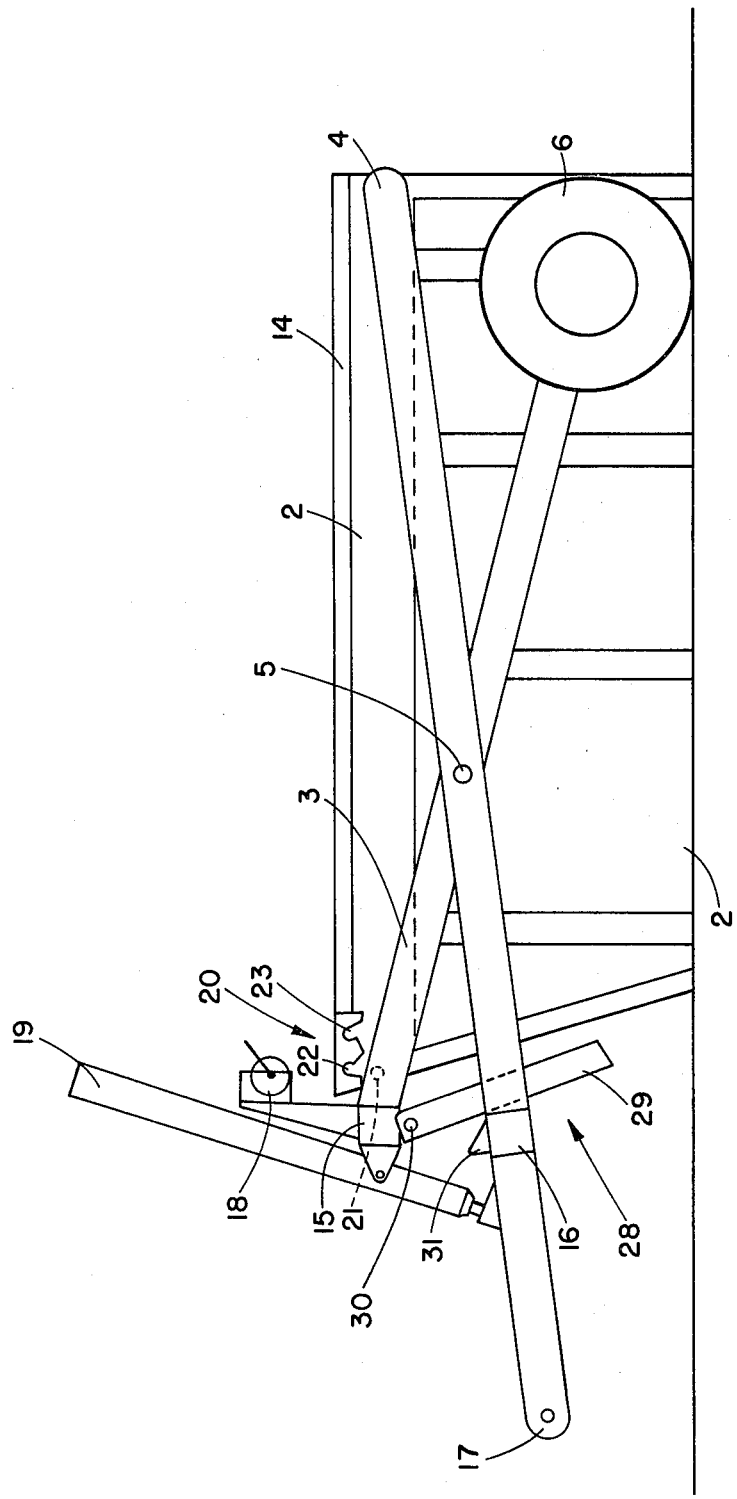
FIG. 8 is a side view of an alternative construction of trailer in the fully lowered position with its container on the ground.
Figure 9:
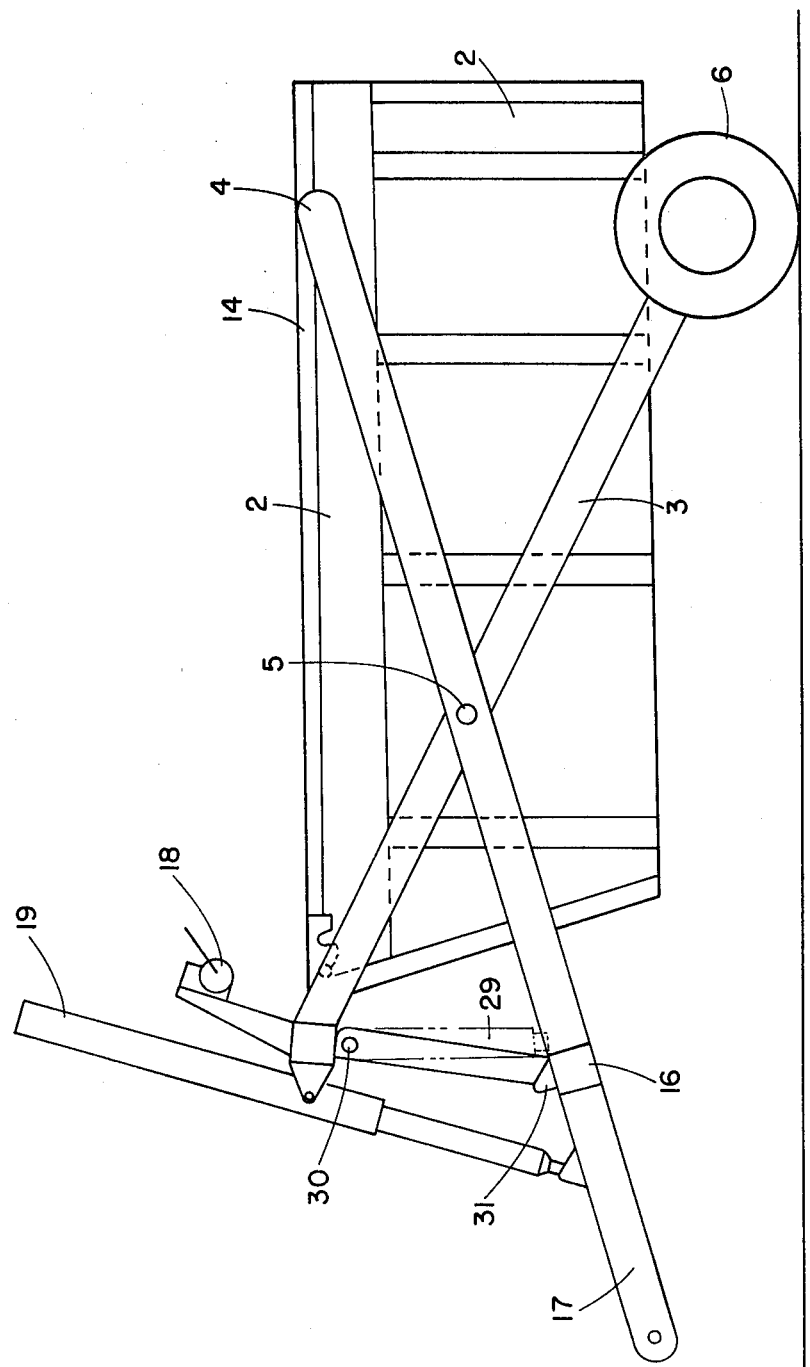
FIG. 9 is a side view of this alternative construction of trailer in the transporting position.
Figure 10:
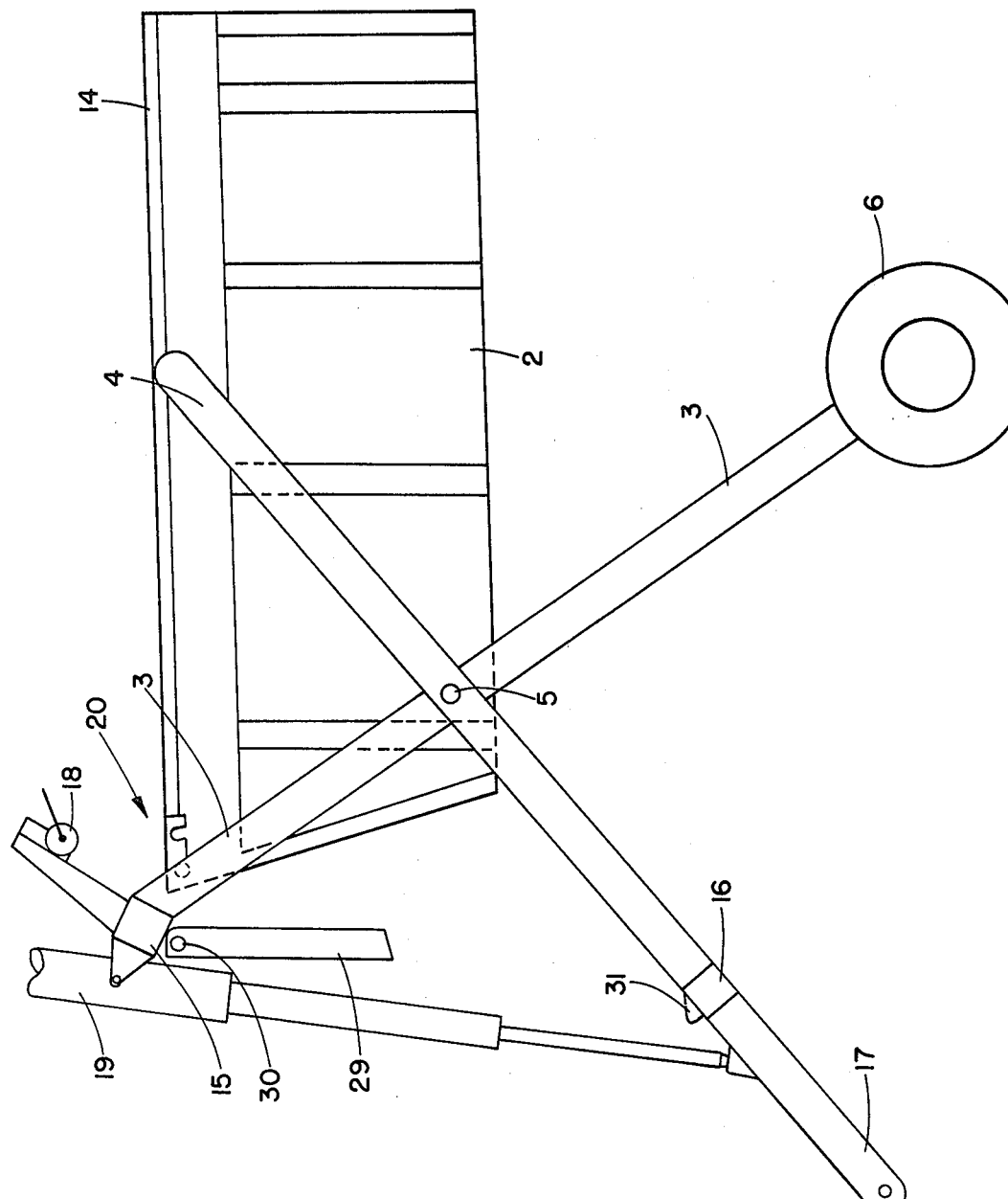
FIG. 10 is a side view of this alternative construction in the raised position.
Figure 11:
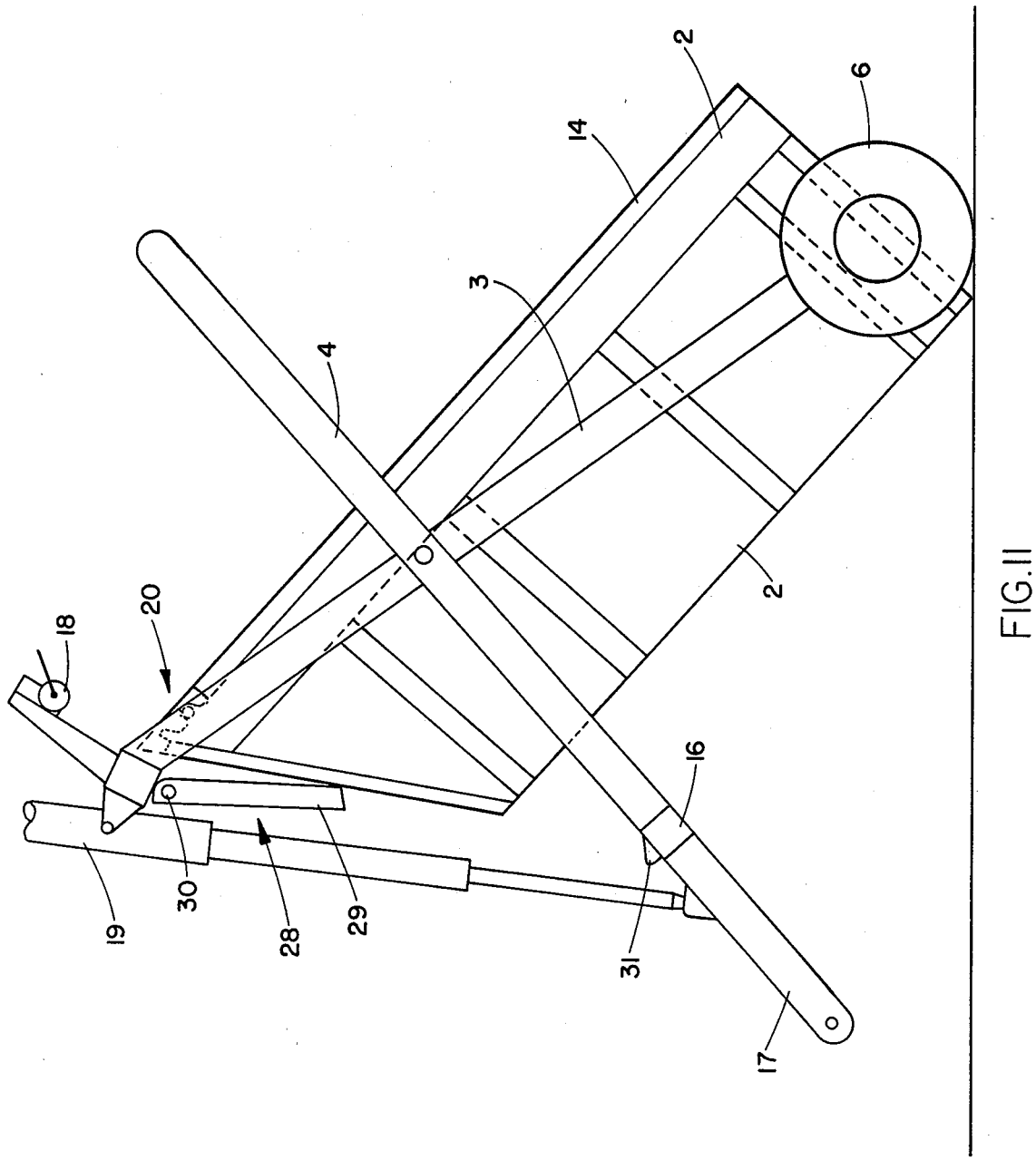
FIG. 11 is a side view of this alternative construction of trailer in the tipping position, FIG. 12(a) and (d) are diagrammatic views of the mounting means of this alternative construction of trailer.
Figure 12A:
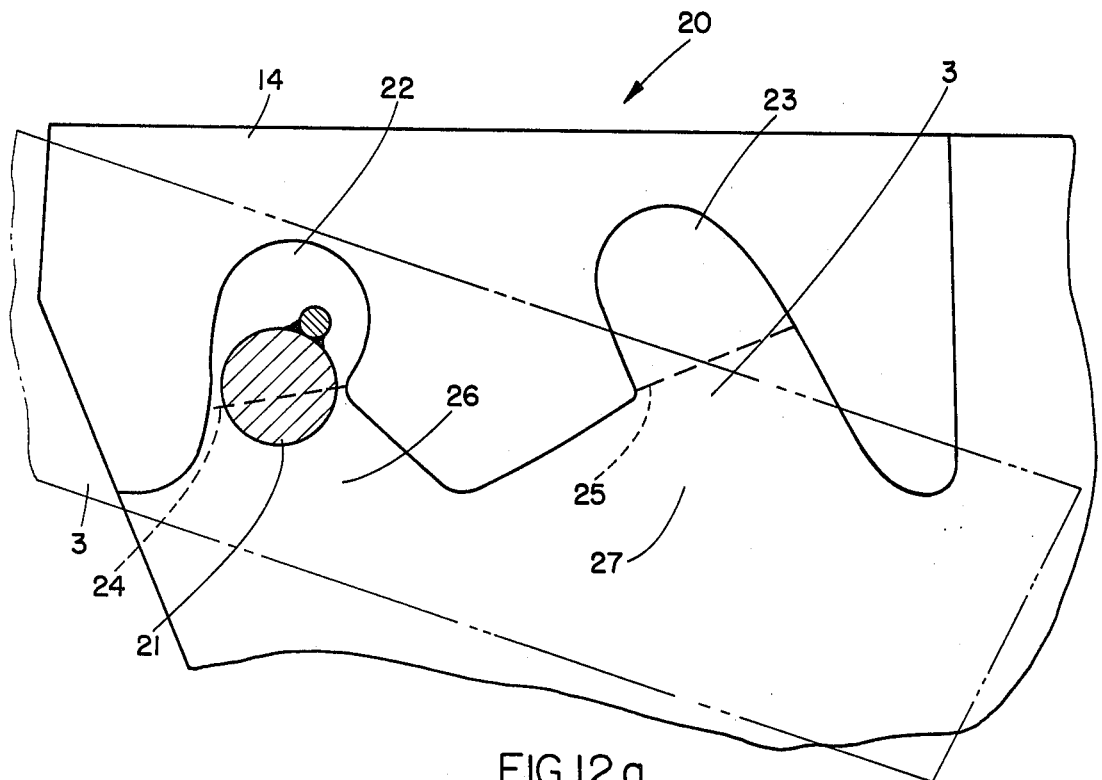
Figure 12B:
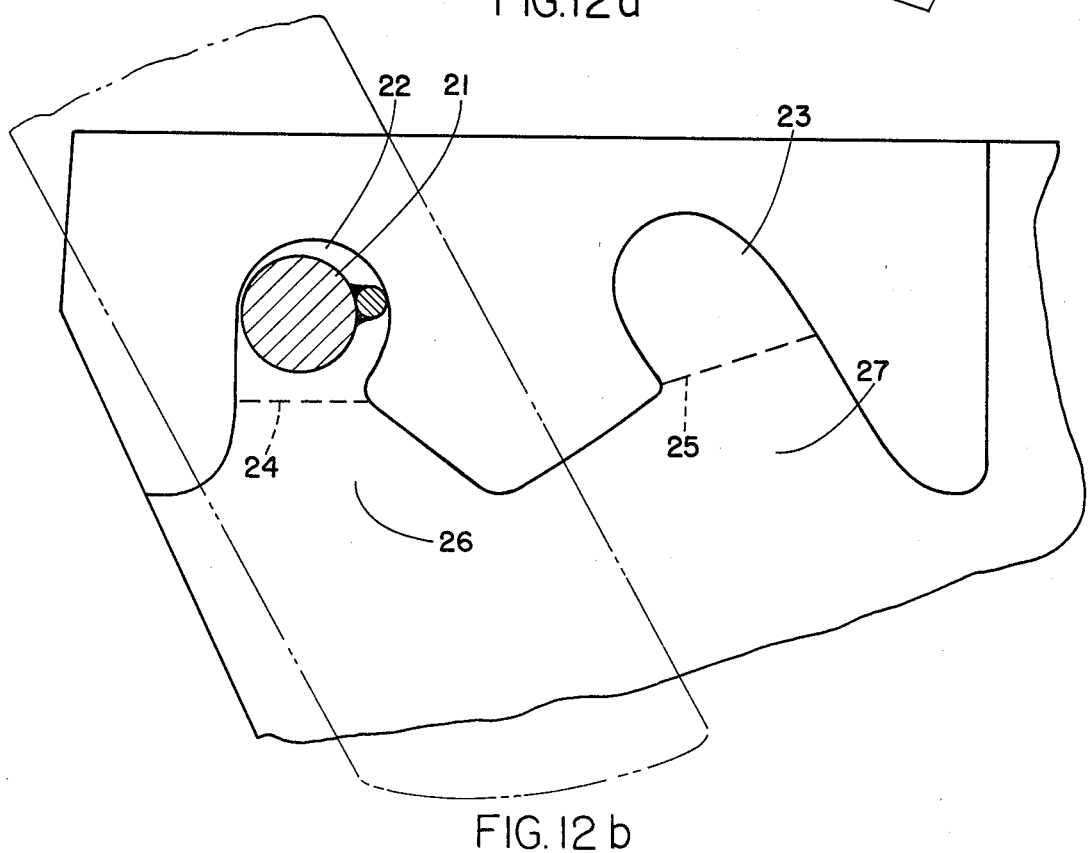
Figure 12C:
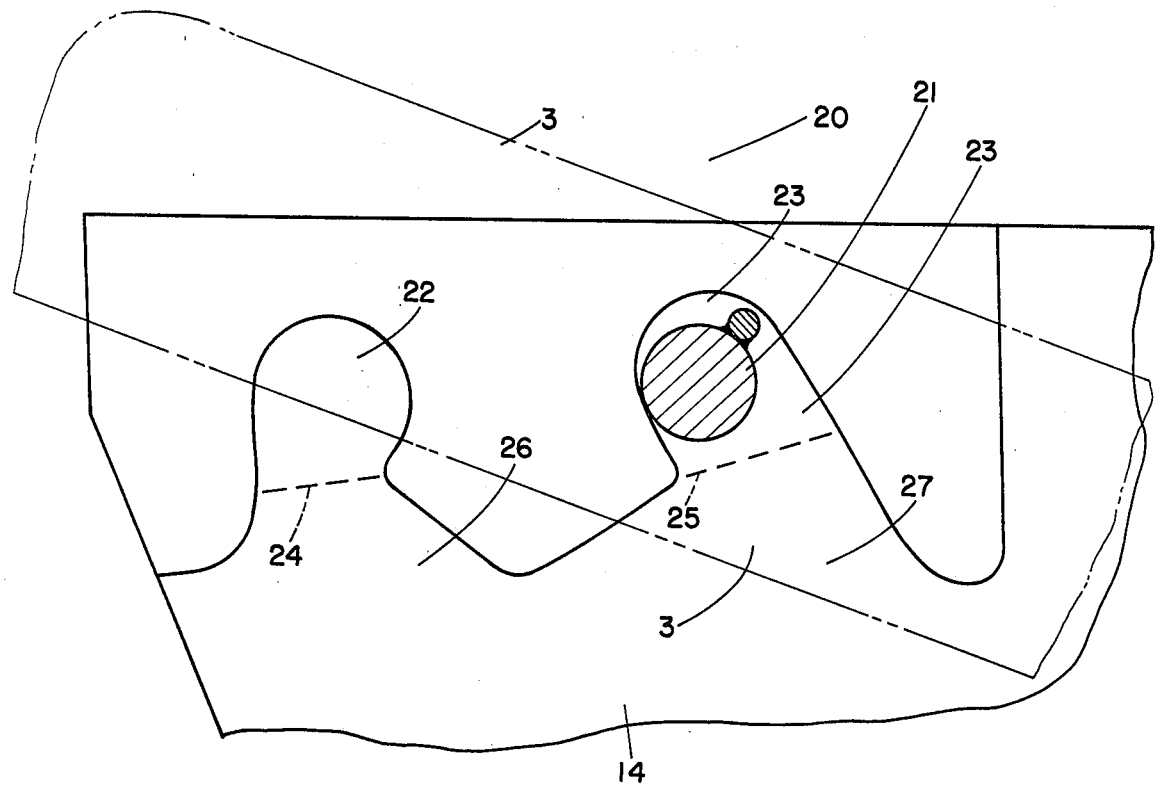
Figure 12D:
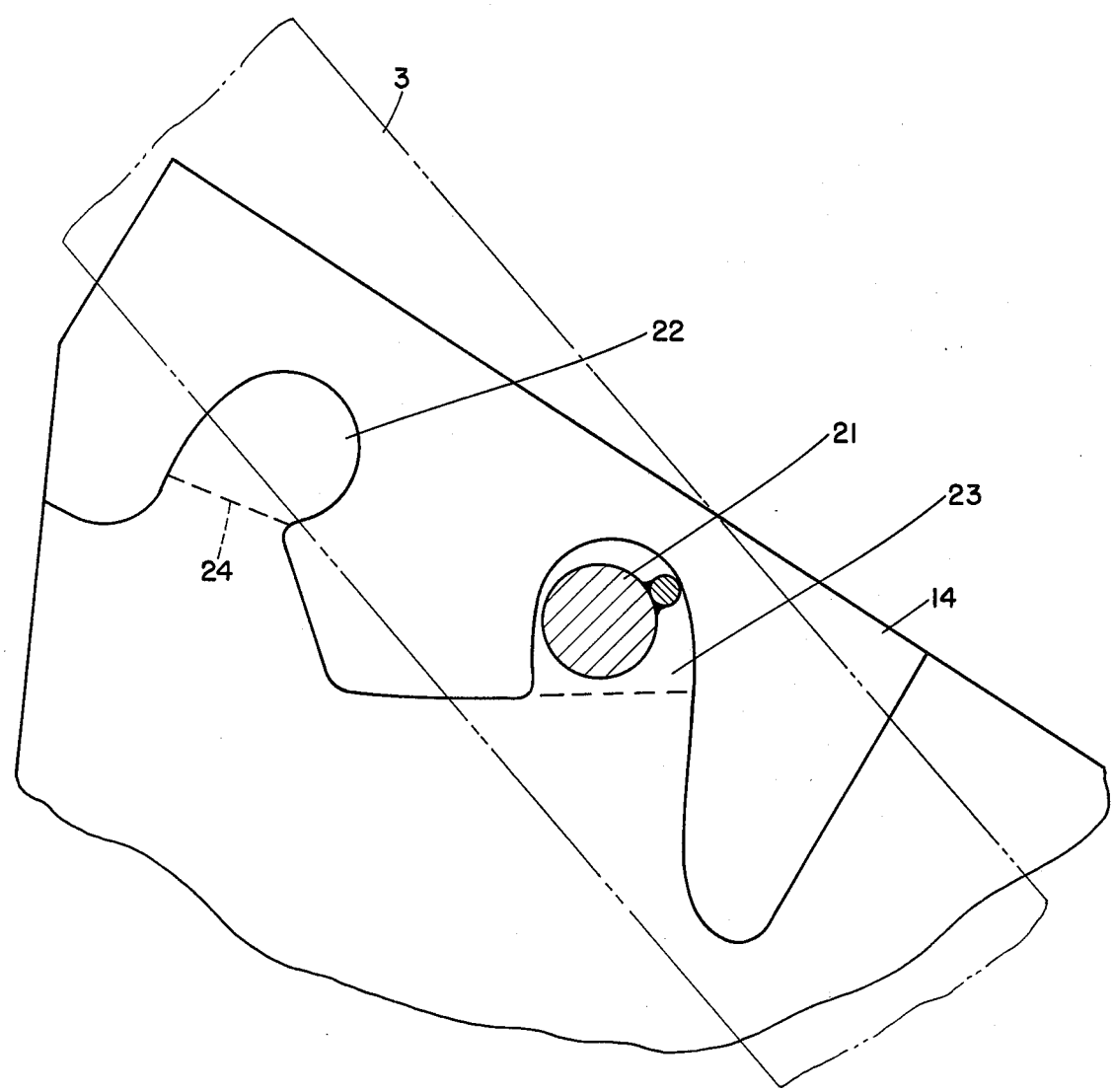

The locking member 28 will, in the fully lowered position, so lie that the bar 29 engages the lower cross member 16 sliding along it as illustrated in FIG. 8. When the container is raised to the transporting position as illustrated in FIG. 9 the locking member 29 will still lie so that the bar 29 is vertical and not engaging the socket 31. The bar 29 can readily engage the socket 31 either being placed in it by the use of, for example, a flexible connecting member attached to it or simply by moving the trailer backwards and forwards so as to rock the bar 29 into position. The locking member 28 is shown in the disengaged positions in FIGS. 10 and 11.

Figure 13:
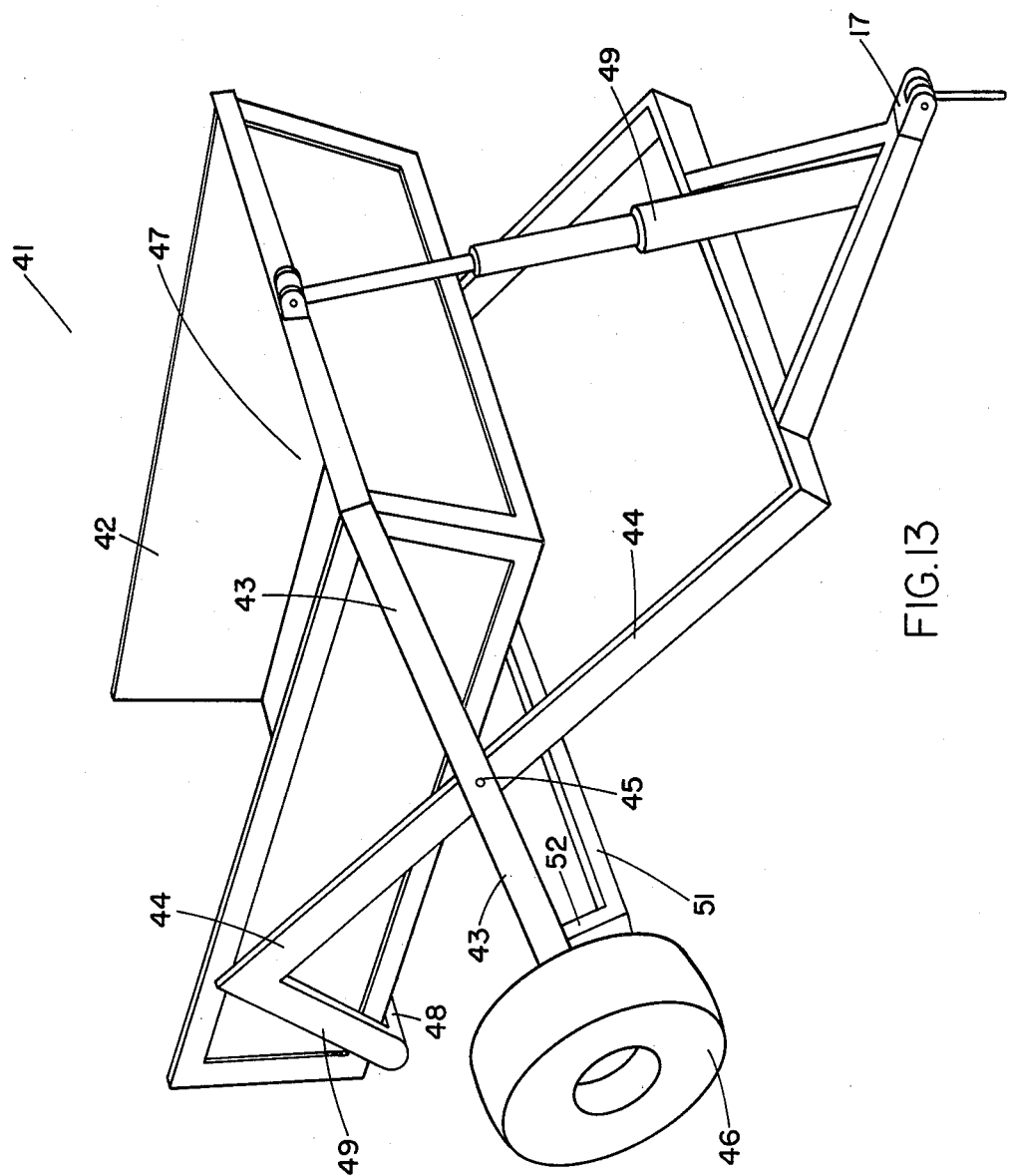
FIG. 13 is a perspective view of a still further construction of trailer according to the invention.
Figure 14:
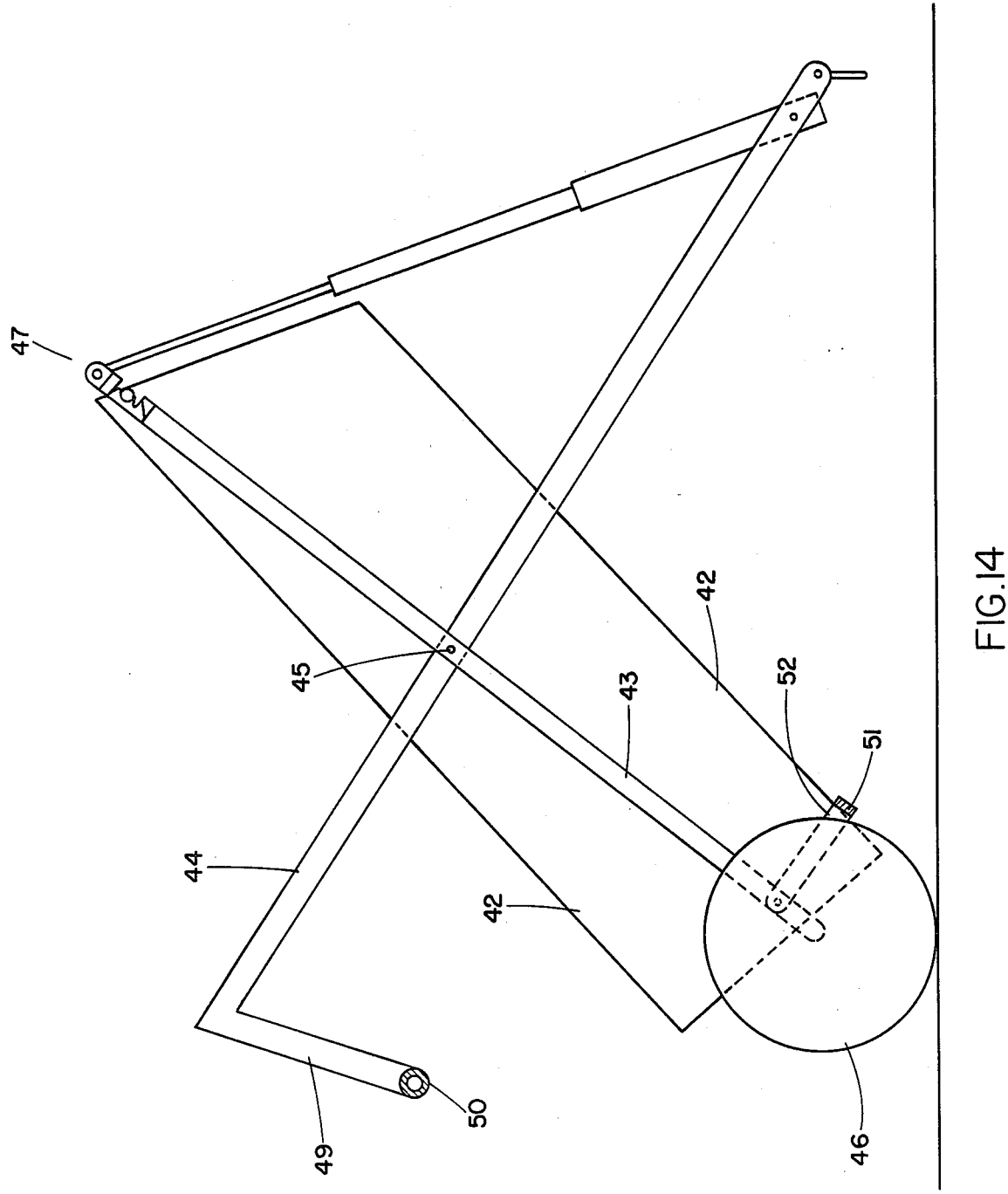
FIG. 14 is a side view of the trailer of FIG. 19 in the tipping position.

Referring to FIGS. 13 and 14 there is illustrated a still further construction of trailer according to the invention indicated generally by the reference numeral 41 for reception of a container 42. There is provided a pair of scissors lift each formed by a first support arm 43 and a second support arm 44 pivotally interconnected intermediate their ends by a lift pivot 45. The first support arm 43 is connected at its rear end to a wheel stub axle (not shown) on which is mounted a ground engaging wheel 46. At the front end of the first arm 43 there is mounting means indicated generally by the reference numeral 47. This mounting means 47 is substantially identical to the mounting means described with reference to the embodiment of FIGS. 1 to 7 and is not described in any more detail. The second support arms 43 instead of engaging the container by means of a roller arrangement are bridged adjacent their rear ends by a container support bracket formed from a transverse support member 48 and a pair of spaced apart uprights 49 each of which is connected at its upper end to a second support arm. Each transverse support member 48 incorporates rollers 50. The first support arms 43 are bridged adjacent their rear ends by a transverse member 51 suspended from each second support arm 44 by pivotally mounted arms 52. As will be seen from FIG. 20 the transverse member 51 supports the container when tipping. The transverse member 51 may be pivoted out of the way in the transporting position that is to say, from the position illustrated in FIG. 13 so that each arm 52 lies along a first support arm 43.

Referring to FIGS. 15 and 16 there is illustrated an alternative construction of container indicated generally by the reference numeral 60 having a flange 61 as in some of the previous embodiments. The container has a base 62, end walls 63 and a pair of side walls 64. Each side wall 64 has a lower portion 65 and an upper portion 66 interconnected by a longitudinally extending inner ledge 67. The said inner ledge 67 is adapted to support another container stacked thereon as will be readily apparent. A tail gate 68 is horizontally pivoted on a hinge 69 at substantially the same height as the inner ledge 67. It will be seen that the tail gate 68 may be pivoted in the direction of the arrows X (see FIG. 15) so as to lie inside the container 60 on the inner ledge 67. The container 60 is provided with a floor 70 of ridged construction in its base 62 to facilitate the winching of heavy objects on and off the container 60. External stiffening ribs 71 are provided as are internal ribs 72 which lie side-by-side. When containers are stacked one on top of the other thus preventing relative movement longitudinally.

Further, the construction of ledge 67 allows containers to be stacked one on top of the other without jamming. Additionally, since the tail gate 68 can be pivoted to lie on the ledge 67 the tail gate 68 can provide an additional raised working platform for the container 60 and further can be stored there while loading or cleaning the container.

Figure 17:
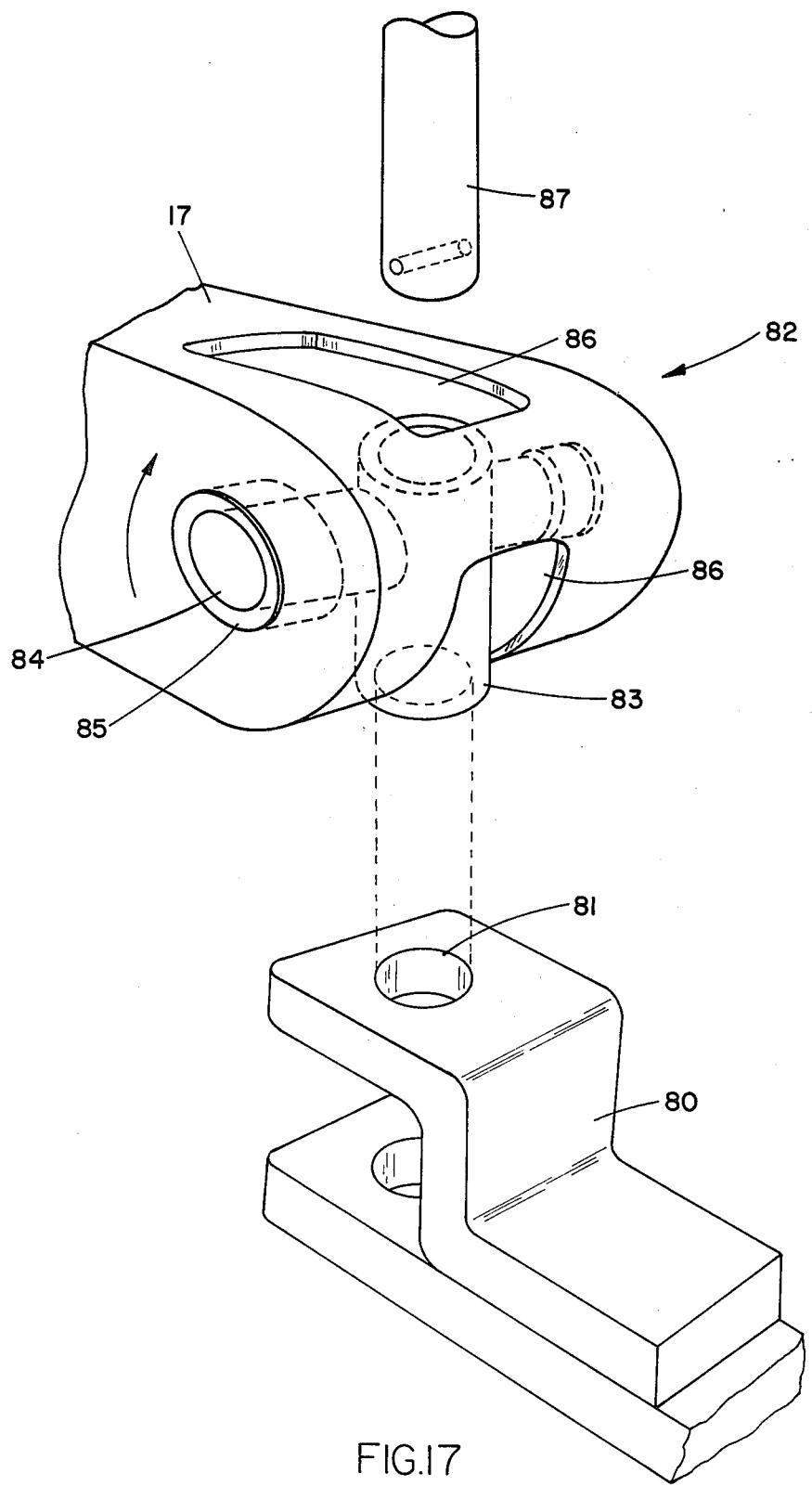
FIG. 17 is a perspective partially exploded view of a tow hitch according to the invention.

Referring to FIG. 17 there is illustrated a construction of tow hitch for fitting to a standard draw bar 80 of a tractor. The draw bar 80 has a pair of holes 81. The hitch is indicated generally by the reference numeral 82 and is mounted within the tow bar, such as, for example, the tow bar 17 of the embodiment of FIG. 1. A socket 83 is pivotally mounted within the two bar 17 by a pair of cross bars 84 housed in plain bearings 85. The socket 83 which is manufactured from a length of steel pipe projects below the tow bar 17. It will be noted that cut outs 86 are provided in the tow bar 17. A conventional steel pin 87 is provided for engagement of the socket 83 and the holes 81. The tow bar 17 swings as the trailer is raised and lowered and the tow hitch 82 accommodates this movement. Since the socket 83 projects below the tow bar 17 and rests on the draw bar 80 the trailer draw bar 80 is clear of the tow hitch 82 to facilitate easy turning.

It will be appreciated that while the means for moving the arms of the scissors lift relative to each other as been described as a ram 19, any other suitable means could have been used, for example, a screw jack or the like.

It is envisaged that although the trailer has been described for towing behind, for example, a tractor, it could also form part of a truck body.

It is further envisaged that although mounting means for the container are provided on each first arm, a single mounting means could have been provided adjacent the centre portion of the upper cross-member 15, or indeed in any suitable location.

Furthermore, it will be appreciated that the rollers 12 are not essential to the invention and indeed, it is envisaged that the rear ends of the second arms could directly slidably engage the container.

It will also be appreciated that while the trailer has been described as having a container, this could easily be replaced by a platform. Additionally, it will be appreciated that the moving means, in other words, the ram could be mounted in any other suitable location.

I claim:

1. A trailer comprising:
   a container;
   a pair of co-operating scissors lifts laterally spaced apart for reception of the container therebetween, each scissors lift comprising a first and second support arm pivotally connected intermediate their ends to define a scissors pivot;
   means for moving the support arms relative to each other to operate the scissors lift;
   a pair of wheel axles, the wheel axles being respectively connected to the first support arms at their rear ends;
   a mounting means for pivotal connection of the front end of the first arms to the container, the mounting means defining longitudinally spaced apart tilt and lift pivot positions for the container relative to the scissors pivot; and
   engagement means adjacent the rear end of the second arms to slidably engage the container, the engagement means being disengageable from the container when the first arms are in the tilt position.

2. A trailer as claimed in claim 1 in which the mounting means comprises a lug on the container projecting laterally therefrom for engagement in a pair of side by side U-shaped longitudinally spaced-apart slots in the first arm, the slot furthest from the scissors pivot defining the tilt pivot position and the other slot the lift pivot position, the slots being so arranged that in the lowermost position of the first arm the lug lies above the slots and the first arm may be moved with the trailer, relative to the container on the ground, to change the pivot position.

3. A trailer as claimed in claim 1 in which the mounting means comprises a lug for mounting on the first arm to project laterally therefrom to engage in a pair of side by side longitudinally spaced-apart inverted U-shaped slots in the container, the slot nearest the front of the container defining the lift pivot position, and the other slot the tilt pivot position, the slots being so arranged that in the lowermost position of the first arm the lug lies below the slots and the first arm may be moved with the trailer relative to the container on the ground to change the pivot position.

4. A trailer as claimed in claim 2 or 3 in which at least the slot defining the lift pivot position is elongated transversely relative to a restricted entry mouth.

5. A trailer as claimed in claim 4 in which the lug is so dimensioned that it is narrower in cross-section about one axis to allow entry to the mouth in the lower position of the front arm and on raising the trailer and pivoting the lug in the slot prevents exit from the slot.

6. A trailer as claimed in claim 4 in which each slot includes an outwardly diverging portion from its mouth for location of the lug.

7. A trailer as claimed in claim 1 in which each first arm has a wheel mounted on its stub axle.

8. A trailer as claimed in claim 1 in which the second support arms are bridged adjacent their rear ends by a container support bracket formed from a transverse support member and a pair of spaced apart uprights each of which is connected at its upper end to a second support arm.

9. A trailer as claimed in claim 1 in which the engagement means comprises an inwardly directed roller mounted on a transverse stub axle, said roller lying beneath and within a channel-section formed by a flange mounted on a longitudinal side of the container.

10. A trailer as claimed in claim 1 in which a locking member is provided between a first and second support arm, the locking member comprising a bar pivotally mounted between the uppermost of the two arms some distance from the scissors pivot and a socket member for the other arm for reception of the free end of the bar.

11. A trailer as claimed in claim 1 in which the container has a base end wall and a pair of side walls, each side wall having a lower portion and an upper portion, interconnected by a longitudinally extending inner ledge, said ledge being adapted to support another container stacked thereon.

12. A trailer as claimed in claim 11 in which there is provided a tail gate horizontally pivoted at substantially the same height as the inner ledge.

* * * * *